US008782468B2

(12) United States Patent
Bhattacharyya et al.

(10) Patent No.: US 8,782,468 B2
(45) Date of Patent: Jul. 15, 2014

(54) METHODS AND TOOLS TO DEBUG COMPLEX MULTI-CORE, MULTI-SOCKET QPI BASED SYSTEM

(75) Inventors: Binata Bhattacharyya, Bangalore (IN); Jayakrishna Guddeti, Bangalore (IN); Keshavan K. Tiruvallur, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 216 days.

(21) Appl. No.: 13/333,952

(22) Filed: Dec. 21, 2011

(65) Prior Publication Data

US 2012/0166882 A1 Jun. 28, 2012

(30) Foreign Application Priority Data

Dec. 22, 2010 (IN) .......................... 3070/DEL/2010

(51) Int. Cl.
*G06F 11/00* (2006.01)
(52) U.S. Cl.
USPC ........................................... 714/30; 714/733
(58) Field of Classification Search
USPC .......... 714/30, 31, 32, 48, 724, 725, 733, 734
See application file for complete search history.

(56) References Cited

U.S. PATENT DOCUMENTS

| 6,289,473 B1 * | 9/2001 | Takase ............................ 714/35 |
| 7,536,597 B2 | 5/2009 | McGowan |
| 7,712,084 B2 * | 5/2010 | Beuten et al. ................. 717/129 |
| 7,836,359 B2 * | 11/2010 | Singh et al. ..................... 714/48 |
| 2006/0059286 A1 * | 3/2006 | Bertone et al. ................. 710/260 |
| 2008/0209176 A1 | 8/2008 | Singh et al. |
| 2008/0229166 A1 | 9/2008 | Datta et al. |

FOREIGN PATENT DOCUMENTS

| EP | 1659754 A1 | 5/2006 |
| KR | 10-0619960 B1 | 9/2006 |
| KR | 10-2008-0112420 A | 12/2008 |
| WO | 2012/087894 A2 | 6/2012 |
| WO | 2012/087894 A3 | 1/2013 |

OTHER PUBLICATIONS

International Search Report and written Opinion Received for PCT Application No. PCT/US2011/065764, Mailed on Sep. 20, 2012, 10 pages.
International Preliminary Report on Patentability and Written Opinion received for PCT Application No. PCT/US2011/065764, mailed on Jul. 4, 2013, 5 pages.

* cited by examiner

*Primary Examiner* — Dieu-Minh Le
(74) *Attorney, Agent, or Firm* — Caven & Aghevli LLC

(57) ABSTRACT

Methods and apparatus relating to debugging complex multi-core and/or multi-socket systems are described. In one embodiment, a debug controller detects an event corresponding to a failure in a computing system and transmits data corresponding to the event to one of the other debug controllers in the system. Other embodiments are also disclosed and claimed.

20 Claims, 7 Drawing Sheets

METHODS AND TOOLS TO DEBUG COMPLEX MULTI-CORE, MULTI-SOCKET QPI BASED SYSTEM

FIELD

The present disclosure generally relates to the field of electronics. More particularly, some embodiments relate to debugging complex multi-core and/or multi-socket systems.

BACKGROUND

Some computers include multiple sockets to allow for utilization of multiple processors. For example, each socket may be coupled to a single processor or multiple processors. As system complexity increases, debugging is becoming more challenging. However, some current debug mechanisms may be only capable of debugging failures which are local to a single socket. Other solutions may be too costly or time-consuming to use. In some situations, even manual intervention may be required. With increasing processor complexity, debugging the multi-core and/or multi-socket systems has become a major concern.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

DETAILED DESCRIPTION

In the following description, numerous specific details are set forth in order to provide a thorough understanding of various embodiments. However, some embodiments may be practiced without the specific details. In other instances, well-known methods, procedures, components, and circuits have not been described in detail so as not to obscure the particular embodiments. Various aspects of embodiments of the invention may be performed using various means, such as integrated semiconductor circuits ("hardware"), computer-readable instructions organized into one or more programs ("software") or some combination of hardware and software. For the purposes of this disclosure reference to "logic" shall mean either hardware, software, or some combination thereof.

Some of the embodiments discussed herein may provide for debugging failures across multiple sockets and/or multiple agents/processors. In one embodiment, when debugging post-silicon failures (during run-time), there is no need to spend time on reproducing the failure (as may be customary in some current implementations). This in turn would save debug time and thus reduce overall processor design costs. Moreover, some embodiment may be used to debug failures such as global and temporal failures, system or cluster coherency failures, data inconsistency failures during post silicon debug.

In an embodiment, all system transactions (e.g., requests or responses) are collected for a programmed set of physical addresses at one debug controller. This in turn enables the checking of protocol rules across multiple sockets at same time. Also, since the data structures are programmable in an embodiment, there is less risk of introducing a bug in debug infrastructure when compared to current hardware based debuggers. In one embodiment, debugging is possible at failure (without having to wait for failing symptoms). Also, a programmable capability of debug infrastructure is provided in some embodiments.

In contrast, current solutions generally do not provide any history information regarding states across multiple sockets. For example, if multiple caching agents keep cache-line in modified state (even though it would result in sending invalidating responses), the existing debug solutions may not be able to detect it as they generally do not check history of transaction flow across sockets.

Figure 1:
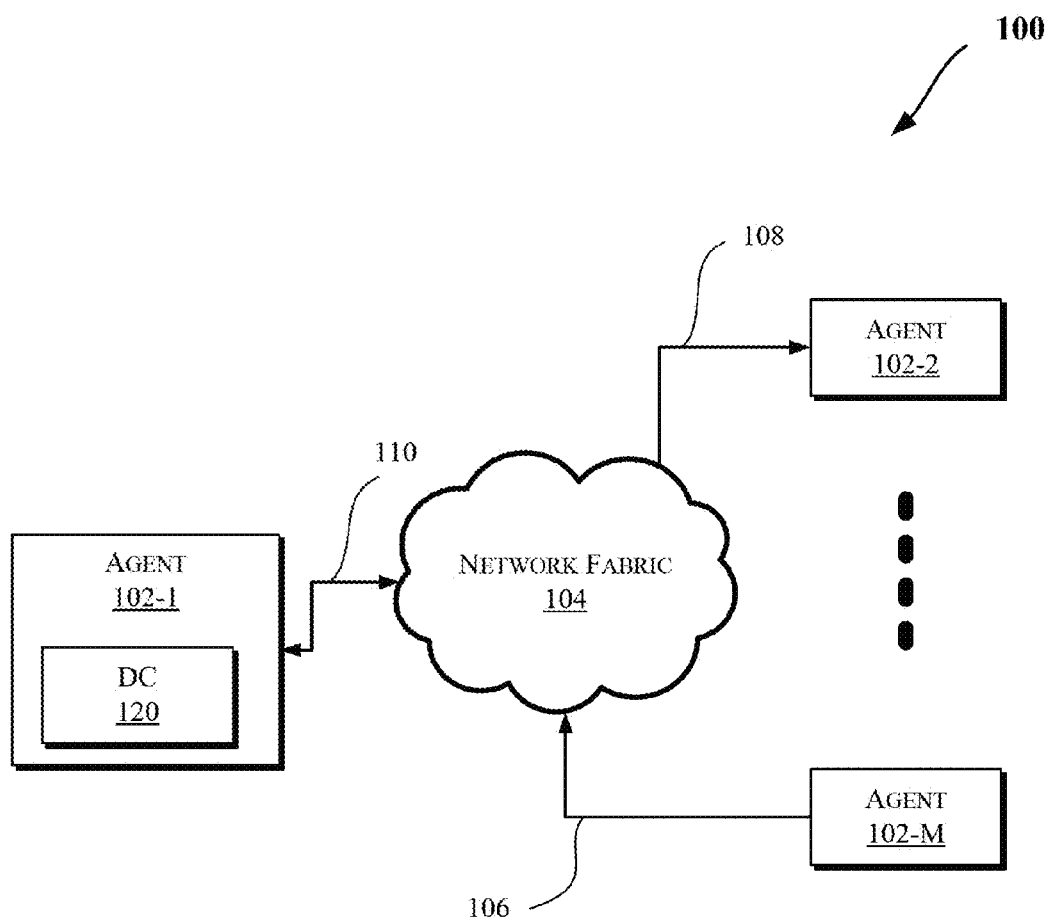
FIGS. 1-2 and 6-7 illustrate block diagrams of embodiments of computing systems, which may be utilized to implement various embodiments discussed herein.

Various embodiments are discussed herein with reference to a computing system component, such as the components discussed herein, e.g., with reference to FIGS. 1-2 and 6-7. More particularly, FIG. 1 illustrates a block diagram of a computing system 100, according to an embodiment of the invention. The system 100 may include one or more agents 102-1 through 102-M (collectively referred to herein as "agents 102" or more generally "agent 102"). In an embodiment, the agents 102 may be components of a computing system, such as the computing systems discussed with reference to FIGS. 2 and 6-7.

As illustrated in FIG. 1, the agents 102 may communicate via a network fabric 104. In an embodiment, the network fabric 104 may include one or more interconnects (or interconnection networks) that communicate via a serial (e.g., point-to-point) link and/or a shared communication network. For example, some embodiments may facilitate component debug or validation on links that allow communication with fully buffered dual in-line memory modules (FBD), e.g., where the FBD link is a serial link for coupling memory modules to a host controller device (such as a processor or memory hub). Debug information may be transmitted from the FBD channel host such that the debug information may be observed along the channel by channel traffic trace capture tools (such as one or more logic analyzers).

In one embodiment, the system 100 may support a layered protocol scheme, which may include a physical layer, a link layer, a routing layer, a transport layer, and/or a protocol layer. The fabric 104 may further facilitate transmission of data (e.g., in form of packets) from one protocol (e.g., caching processor or caching aware memory controller) to another protocol for a point-to-point network. Also, in some embodiments, the network fabric 104 may provide communication that adheres to one or more cache coherent protocols.

Furthermore, as shown by the direction of arrows in FIG. 1, the agents 102 may transmit and/or receive data via the network fabric 104. Hence, some agents may utilize a unidirectional link while others may utilize a bidirectional link for communication. For instance, one or more agents (such as agent 102-M) may transmit data (e.g., via a unidirectional link 106), other agent(s) (such as agent 102-2) may receive data (e.g., via a unidirectional link 108), while some agent(s) (such as agent 102-1) may both transmit and receive data (e.g., via a bidirectional link 110).

Also, in accordance with an embodiment, one or more of the agents 102 may include a Debug Controller (DC) 120. In some embodiments each CPU socket present in a computing system may include a DC 120 as will be further discussed with reference to FIG. 2. for example.

Figure 2:
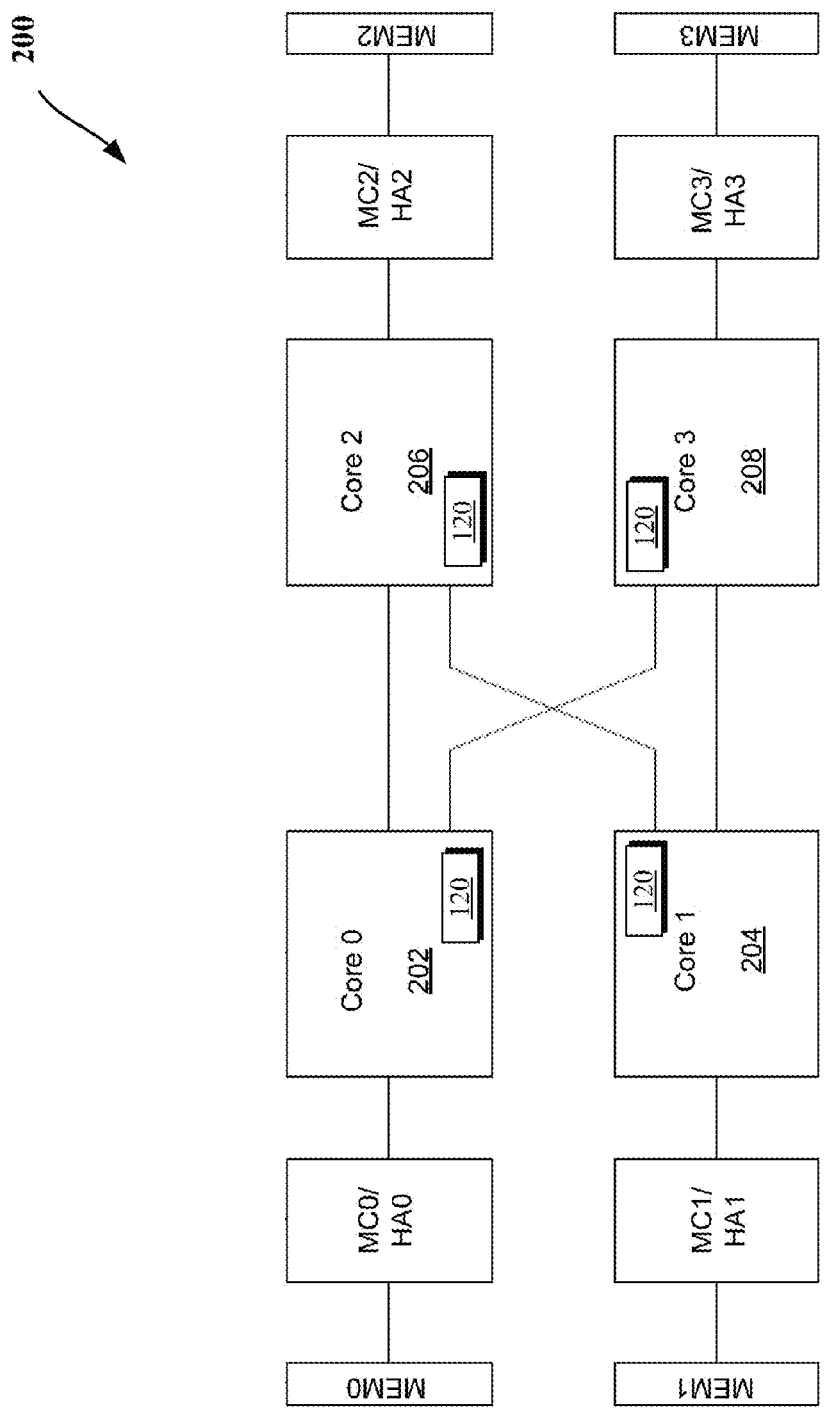

More specifically, FIG. 2 is a block diagram of a computing system 200 in accordance with an embodiment. System 200 may include a plurality of sockets 202-208 (four shown but some embodiments may have more or less socket). Each socket may include a processor and a DC 120. Also, each socket may be coupled to the other sockets via a point-to-point (PtP) link, such as a Quick Path Interconnect (QPI). As discussed with respect the network fabric 104 of FIG. 1, each socket may be coupled to a local portion of system memory, e.g., formed of a plurality of Dual Inline Memory Modules (DIMMs) that may include dynamic random access memory (DRAM).

As shown in FIG. 2, each socket may be coupled to a memory controller (MC)/Home Agent (HA) (such as MC0/HA0 through MC3/HA3). The memory controllers may be coupled to a corresponding local memory (labeled as MEM0 through MEM3), which may be a portion of system memory (such as memory 812 of FIG. 8). In some embodiments, the memory controller (MC)/Home Agent (HA) (such as MC0/HA0 through MC3/HA3) may be the same or similar to agent 102-1 of FIG. 1 and the memory, labeled as MEM0 through MEM3, may be the same or similar to memory 120 of FIG. 1. Generally, processing/caching agents may send requests to a home node for access to a memory address with which a corresponding "home agent" is associated. Also, in one embodiment, MEM0 through MEM3 may be configured to mirror data, e.g., as master and slave. Also, one or more components of system 200 may be included on the same integrated circuit die in some embodiments.

An implementation such as shown in FIG. 2 thus may be for a socket glueless configuration with mirroring. For example, data assigned to a memory controller (such as MC0/HA0) may be mirrored to another memory controller (such as MC3/HA3) over the PtP links. Also, the directory associated with memory controller MC3/HA3 may initialized in the unknown (U)-state upon a copy to mirror. Upon failover to this controller (e.g., due to an online service-call for this memory controller), the directory may be reconstructed from the U-state.

In one embodiment, a multiprocessor has four or more sockets. Each socket may implement ten integrated cores one the same die. Each socket may be connected to other sockets via point-to-point QPI link. Each socket may include two Caching Agents (CA), one Routing Agent, and two Home Agents (HA) along with associated DRAM memory connected via memory controller. Ten cores may share a (e.g., 30 MB) Last Level Cache (LLC), which is implemented as ten separate three MB LLC slices, each managed by a separate cache controller. Five cache controllers CBox0 to CBox4 may be connected to System agent 0 and CBox1 to CBox5 may be connected to System agent 1 for any system requests going out to memory or external socket. Each CBox may talk to each other using ring connectivity. Moreover, an LLC miss from CBox may be sent out to its associated System agent where the packet is formed following QPI link layer. Each CBox may maintain a Source Address Decoder (SAD) which provides Destination Home Node ID (HNID) as it is mapped per physical address (PA). Each of the system read or write requests may then be sent out of System agent with a unique transaction ID called RTID (Requester Transaction Identifier). A router table at Routing agent may be used to route the system requests from System agent to external socket based on its destination Node Identifier (NID). Home Agents may be responsible for maintaining memory ordering and per address conflict handling for all reads and writes to memory in some embodiments.

As shown in FIG. 2, each socket may implement a DC. Each DC may be programmed to be used for a range of Physical Addresses (PAs). Every DC may maintain multiple FIFOs (First-In, First-Out buffers) or data structures where each FIFO/data structure maintains data, such as a time stamp, an event type, PA, and GUTID (Global Universal Transaction ID per address). In some embodiments, GUTID may be used as a unique transaction ID which corresponds to one or more of: a Requester Source Node ID (RSNID), a Requester Transaction ID (RTID), and/or Destination Node ID (DNID).

Figure 3:
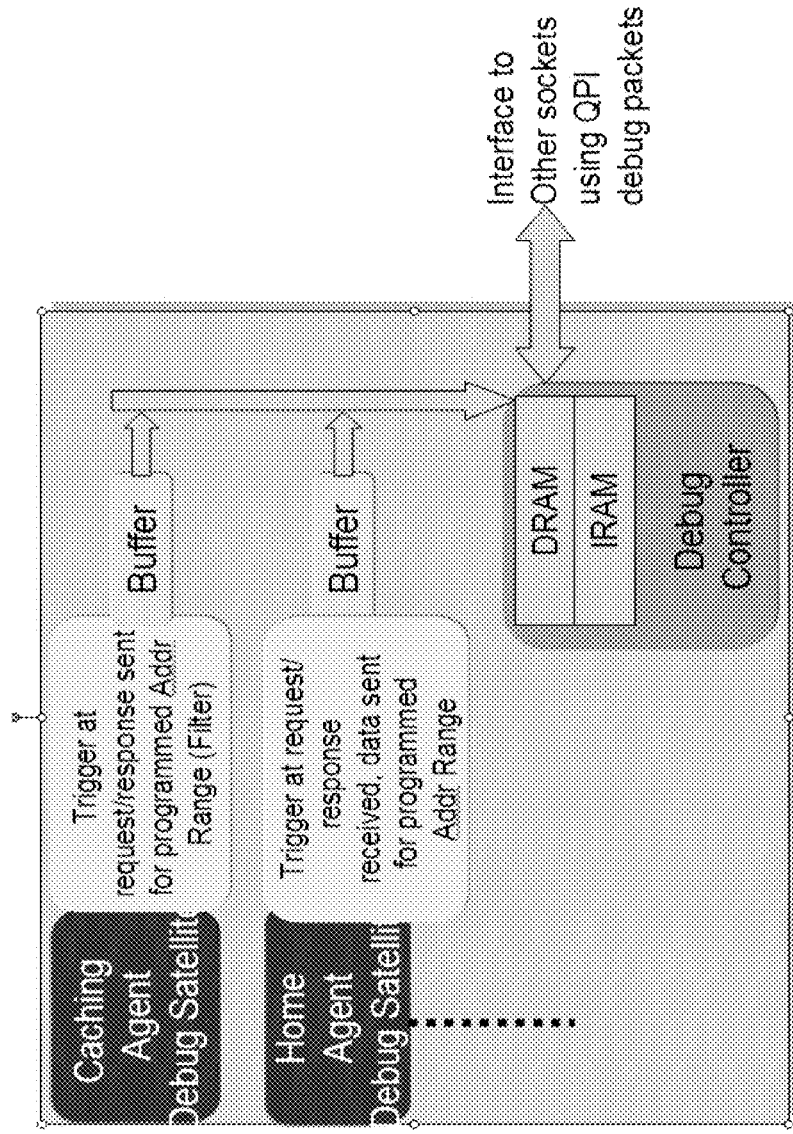
FIG. 3 a block diagram of an intra die debug controller system, according to an embodiment.

FIG. 3 illustrates a block diagram of an intra die debug controller system, according to an embodiment. In an embodiment, one or more of the components shown in FIG. 3 may be present in the DC 120 of FIGS. 1-2. As shown, the DC may include a Data Random Access Memory (DRAM) to store data and/or an Instruction RAM (TRAM) to store code. Data RAM may be used to store the transaction information and intermediate variables while processing the transactions by DC. The Instruction RAM of DC may contain code to process the transactions and determine any failures.

As shown in FIG. 3, each box or agent (CA (Caching Agent) and HA (Home Agent)) may maintain its own debug satellite which collects data regarding local events, e.g., while each agent is triggered as programmed. In an embodiment, all triggered events from all agents are targeted to the DC for that local socket. Moreover, when a DC receives an event (request or response) for a PA which is not owned by that DC, it sends that event (or data corresponding to the event, such as an indicia or hint corresponding to the event that would be recognized by another DC as corresponding to the event (e.g., based on previously stored information)) to a DC in another socket which owns that PA. For example, of a request is received at DC0 at socket0 for PA2 (which belongs to socket 2), DC0 re-directs the event to DC2. Thus, at any time, each DC may keep track of all global events for a particular PA and the DC is not limited to local debug issues. This in turn helps with detecting and debugging global issues.

As for the communication protocol between a local DC and a remote DC, the following two possible options may be used for sending an event from one DC (e.g., local) to another DC (e.g., remote), in accordance with some embodiments: (1) in Debug mode, using QPI debug packet format, router may send the debug packet received from local DC to the destination socket in a similar fashion as normal packet routing; and/or (2) some unused memory (e.g. unused space in some reserved memory if it is not used by core) may be used to store the packet from one DC and read the packet from another DC based on a hint received from the transmitter DC. In an embodiment, the first option may used in existing processors because they already include the infrastructure or a minor hardware change may be needed to add the destination to DC in the remote socket.

Figure 4:
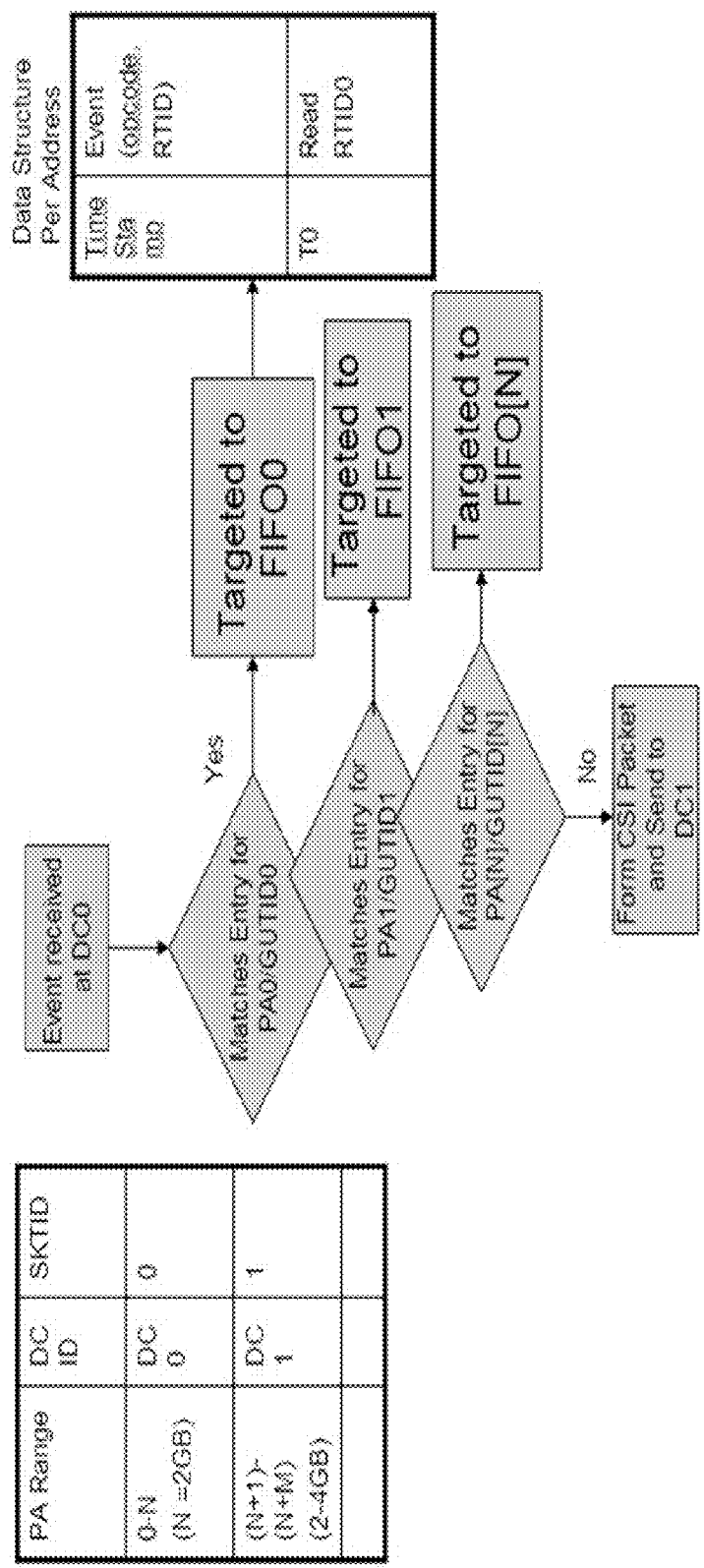
FIGS. 4-5 illustrate flow diagrams of methods according to some embodiments.

FIG. 4 illustrates a flow diagram of data capture at a debug controller, according to an embodiment. In an embodiment, the flow shown in FIG. 3 may be used for the DC 120 of FIGS. 1-3. Moreover, each DC may maintain two CAM (Content Addressable Memory) structures that are addressable based on PA and/or GUTID. For incoming requests/responses, CAM may be valid for PA or for a response or Cmp (Complete). And, CAM may be valid for GUTID of prior received request.

As shown in FIG. 4, each DC may contain a table listing range of PAs belongs to each DC in the system, e.g., as shown in FIG. 4, 0-2GB PA is owned by DC0 (of socket SKTID-0) and 2-4 GB PA is owned by DC1 (of socket SKTID-0), and so on. And as shown in FIG. 4, each PA may contain a data structure to store/associate all events for that PA. This data structure may contain information such as, time stamp of each event related to a particular PA, event type (indicated by opcode, e.g. request, snoop, response etc), requester transaction ID, etc. The information in this data structure may or may not necessarily include all events of a transactions, e.g., based on the failure to debug events and data stored in this data structure may vary. As shown in FIG. 4, if the received event belongs to a DC, it will have a hit (e.g., CAM match). Depending on programmed address range, if the event is targeted to remote DC, a debug packet will be generated and redirected from local DC to remote DC, allowing the event to be targeted to another socket in some embodiments. Based on CAM matches on a particular PA, the data structure or FIFO for that PA will be selected for update in an embodiment. For example, FIFO0 is selected for event with PA0.

In an embodiment, each DC may maintain a protocol checker per PA. While any event is received at DC, global protocol checker may be triggered which checks rules across all sockets per PA. For example, at time t0, if a cache line (corresponds to PA) is in Modified state in both socket0 and socket1, DC will flag an error. Thus, it may find any protocol or logic error at its failure point instead of waiting for symptoms of failure.

Moreover, at any single time, approximately 200 read/write system requests for different addresses may exist per socket in some implementations. Having limited area of approximately 50 CAM entries of PAs in each DC, the CAM may be programmed to have an address range of 50 different PAs and try to capture the failure. If failure does not match the programmed address range, programming may be changed to the next address range; thus, a matching failure address range may be achieved.

Figure 5:
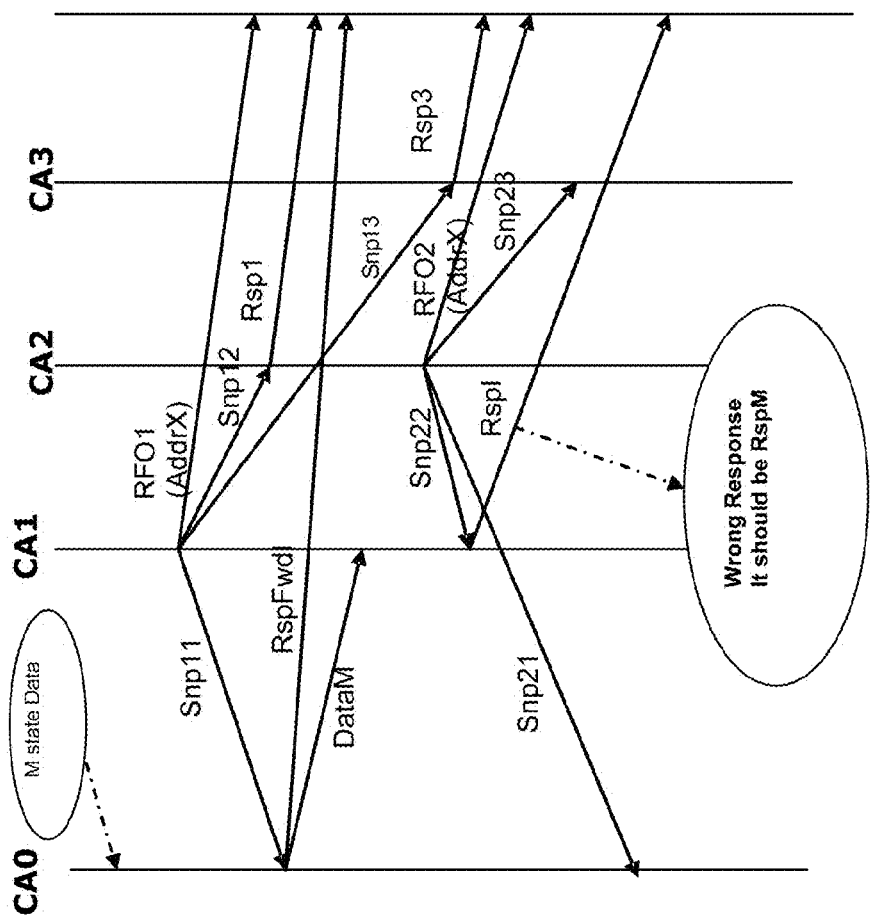

FIG. 5 illustrates a flow diagram illustrating a failure. The failure occurs when the final response received at CA1 is wrong, RspI instead of RspM. In FIG. 5, CA refers to a Caching Agent, HA refers to a Home Agent, and PA refers to a Physical address.

Table 1 bellow illustrates a data structure/FIFO per address according to an embodiment.

TABLE 1

| Time stamp | Event | RTID | Algorithm steps (GUTID = SNID, TID, HNID; |
|---|---|---|---|
| 1 | RFO-A CA' → HNID0 | 1 | Write variable Opcoce - RFO, GUTID-{1, 1, 0}, Write Register. BIT0-1 |
| 2 | SnpLA1: CA1 → CA0 | 1 | Write Opcoce = SnpIn-Owr, GUTID = {1, 1, 0}, Write Reg; BIT1 = 1 |

TABLE 1-continued

| Time stamp | Event | RTID | Algorithm steps (GUTID = SNID, TID, HNID; |
|---|---|---|---|
| 3 | SnpLA2 CA1 → CA2 | 1 | Write Opcoce = SnpIn-Owr, GUTID = {1, 1, 2}, Write Reg: BIT2 = 1 |
| 4 | SnpLA3 CA1 → CA3 | 1 | Write Opcoce = SnpIn-Owr, GUTID = {1, 1, 3}, Write Reg: BIT3 = 1 |
| 5 | RsplA2: CA 2 → HNID0 | 1 | Write Opcoce = Rspl, GUTID = {2, 1, 0}, |
| 6 | RspFwdt CA0 → HNID0 | 1 | Write Opcoce = RsplFwd, GUTID = {0, 1, 0} |
| 7 | DataM: CA0 → CA1 | 1 | Write Opcoce - DataV, GUTID = {0, 1, 1} |
| 8 | RsplA2 CA3 → HNID0 | 1 | Write Opcoce = RspIn-Owr, GUTID = {3, 1, 0} |
| 9 | RFO-E CA2 → HNID0 | 2 | Write Opcoce = RFO, GUTID = {2, 2, 0} |
| 10 | SnpB1 CA2 → CA1 | 2 | Write Opcoce = SnpIn-Owr, GUTID = {2, 2, 1} |
| 11 | RsplB1: CA1 → HNID0 | 2 | Write Opcoce = Rspl, GUTID = {1, 2, 0} |
| 12 | SnpB2 CA2 → CA0 | 2 | Write Opcoce = SnpIn-Owr, GUTID = {2, 2, 0} |
| 13 | SnpB3 CA2 → CA3 | 2 | Write Opcoce = SnpIn-Owr, GUTID = {2, 2, 3} |

As shown in Table 1, each DC may include the following data structures per PA: variables to store information which are required for protocol check. For example:

1. Owner per PA: CoreID, CBoxID, State per PA (M/E/F/S)

2. Transaction Type: [4:0] Opcode (RFO/WbMto*), [4:0] Message Class (HOM/SNP/NCS/NCB etc.)

3. GUTID: [4:0] RSNID, [5:0] RTID, [4:0] DNID

In accordance with an embodiment, a 32-bit register may be used per PA as shown in Table 2 below:

TABLE 2

| Bit15 | Bit14 | Bit13 | Bit12 | Bit11 | Bit10 | Bit9 | Bit8 |
|---|---|---|---|---|---|---|---|
| FrcAckCnflt3 Rcvd | FrcAckCnflt2 Rcvd | FrcAckCnflt1 Rcvd | Data4 Received | Data3 Received | Data2 Received | Data1 Received | Rsp4 Received Cmp4 Rcvd |

| Bit7 | Bit6 | Bit5 | Bit4 | Bit3 | Bit2 | Bit1 | Bit0 |
|---|---|---|---|---|---|---|---|
| Rsp3 Received Cmp3 Rcvd | Rsp2 Received Cmp2 Rcvd | Rsp1 Received Cmp1 Rcvd | Snp4 Received AckCnflt4 Rcvd | Snp3 Received AckCnflt3 Rcvd | Snp2 Received AckCnflt2 Rcvd | Snp1 Received AckCnflt1 Rcvd | Request Received FrcAckCnflt4 Rcvd |

In accordance with one embodiment, Table 3 shows a sample protocol table:

TABLE 3

| Register | Variable | Variable | Algorithm steps |
|---|---|---|---|
| If Bit6 = sets (Rsp2 = 1) | Rsp opcode = 000 (Rspl) | Owner = 2 | Illegal condition fires (Owner can not send Rspl) |

As shown in Table 3, for a particular PA, whenever an event triggers and when the event is received at DC, the DC updates its corresponding bit in its register. At any update of register bits, a protocol checker is triggered in an embodiment. Based on project requirement, register bits may be selectively masked to avoid necessary or unnecessary triggering of the protocol checkers.

Figure 6:
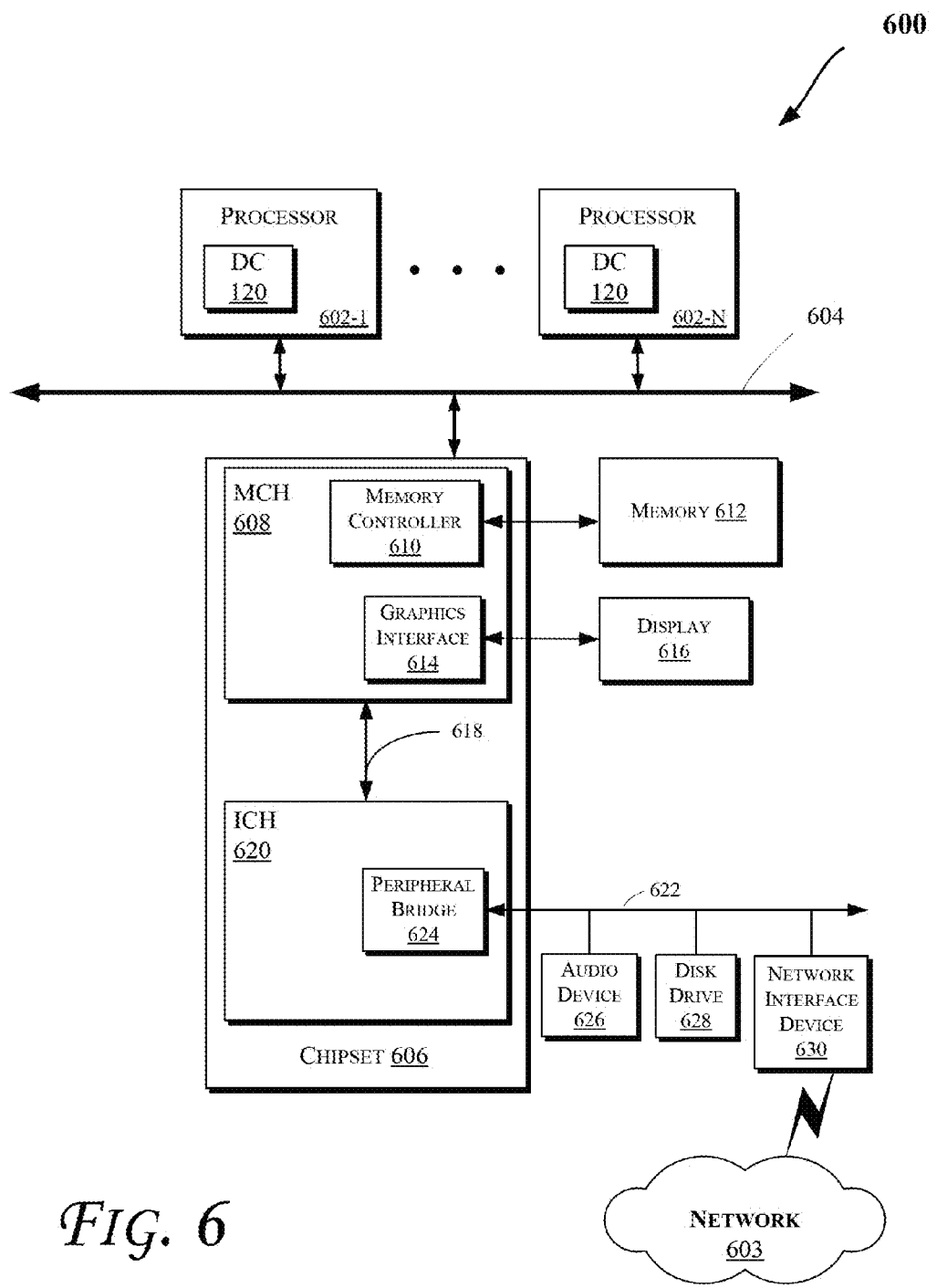

FIG. 6 illustrates a block diagram of a computing system 600 in accordance with an embodiment of the invention. The computing system 600 may include one or more central processing unit(s) (CPUs) 602-1 through 602-N or processors (collectively referred to herein as "processors 602" or more generally "processor 602") that communicate via an interconnection network (or bus) 604. The processors 602 may include a general purpose processor, a network processor (that processes data communicated over a computer network 603), or other types of a processor (including a reduced instruction set computer (RISC) processor or a complex instruction set computer (CISC)). Moreover, the processors 602 may have a single or multiple core design. The processors 602 with a multiple core design may integrate different types of processor cores on the same integrated circuit (IC) die. Also, the processors 602 with a multiple core design may be implemented as symmetrical or asymmetrical multiprocessors. Also, the operations discussed with reference to FIGS. 1-5 may be performed by one or more components of the system 600. In some embodiments, the processors 602 may be the same or similar to the processors 202-208 of FIG. 2. Furthermore, the processors 602 may include the DC 120.

A chipset 606 may also communicate with the interconnection network 604. The chipset 606 may include a memory controller hub (MCH) 608. The MCH 608 may include a memory controller 610 that communicates with a memory 612. The memory 612 may store data, including sequences of instructions that are executed by the CPU 602, or any other device included in the computing system 600. For example, the memory 612 may store data corresponding to an operation system (OS). In one embodiment of the invention, the memory 612 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 604, such as multiple CPUs and/or multiple system memories.

Additionally, one or more of the processors 602 may have access to one or more caches (which may include private and/or shared caches in various embodiments) and associated cache controllers (not shown). The cache(s) may adhere to one or more cache coherent protocols. The cache(s) may store data (e.g., including instructions) that are utilized by one or more components of the system 600. For example, the cache may locally cache data stored in a memory 612 for faster access by the components of the processors 602. In an embodiment, the cache (that may be shared) may include a mid-level cache and/or a last level cache (LLC). Also, each processor 602 may include a level 1 (L1) cache. Various components of the processors 602 may communicate with the cache directly, through a bus or interconnection network, and/or a memory controller or hub. Also, each of the processors 602 (or each core present in the processors 602) may include the DC 120 in some embodiments.

The MCH 608 may also include a graphics interface 614 that communicates with a display device 616, e.g., via a graphics accelerator. In one embodiment of the invention, the graphics interface 614 may communicate with the graphics accelerator via an accelerated graphics port (AGP). In an embodiment of the invention, the display 616 (such as a flat panel display) may communicate with the graphics interface 614 through, for example, a signal converter that translates a digital representation of an image stored in a storage device such as video memory or system memory into display signals that are interpreted and displayed by the display 616. The display signals produced by the display device may pass through various control devices before being interpreted by and subsequently displayed on the display 616.

A hub interface 618 may allow the MCH 608 and an input/output control hub (ICH) 620 to communicate. The ICH 620 may provide an interface to I/O devices that communicate with the computing system 600. The ICH 620 may communicate with a bus 622 through a peripheral bridge (or controller) 624, such as a peripheral component interconnect (PCI) bridge, a universal serial bus (USB) controller, or other types of peripheral bridges or controllers. The bridge 624 may provide a data path between the CPU 602 and peripheral devices (such as device(s) 208 of FIG. 2). Other types of topologies may be utilized. Also, multiple buses may communicate with the ICH 620, e.g., through multiple bridges or controllers. Moreover, other peripherals in communication with the ICH 620 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 622 may communicate with an audio device 626, one or more disk drive(s) 628, and a network interface device 630 (which is in communication with the computer network 603). Other devices may communicate via the bus 622. Also, various components (such as the network interface device 630) may communicate with the MCH 608 in some embodiments of the invention. In addition, the processor 602 and one or more components of the MCH 608 may be combined to form a single chip.

Furthermore, the computing system 600 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 628), a floppy disk, a compact disk ROM (CD-ROM), a digital versatile disk (DVD), flash memory, a magneto-optical disk, or other types of nonvolatile machine-readable media that are capable of storing electronic data (e.g., including instructions).

Figure 7:
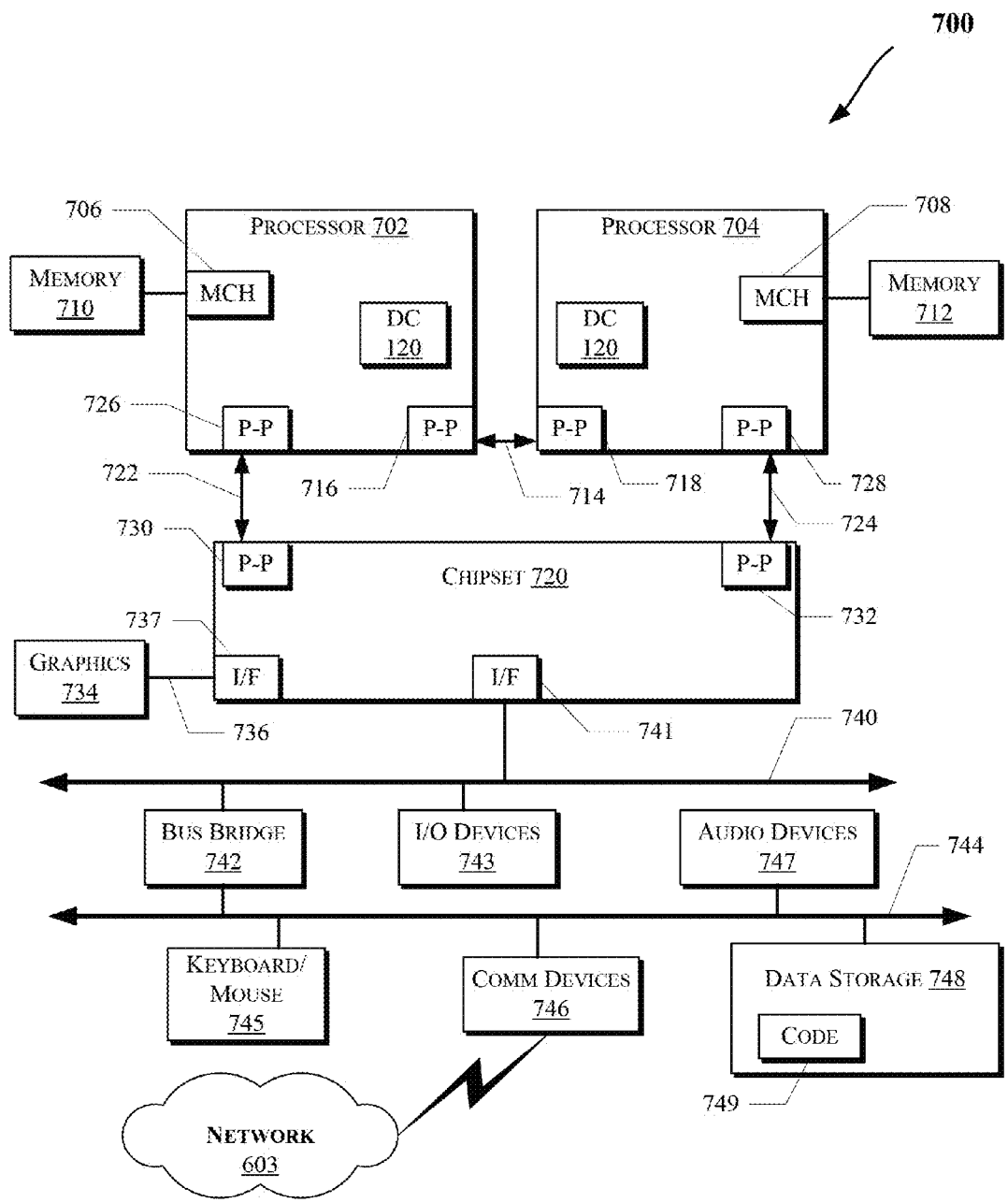

FIG. 7 illustrates a computing system 700 that is arranged in a point-to-point (PtP) configuration, according to an embodiment of the invention. In particular, FIG. 7 shows a system where processors, memory, and input/output devices are interconnected by a number of point-to-point interfaces. The operations discussed with reference to FIGS. 1-6 may be performed by one or more components of the system 700.

As illustrated in FIG. 7, the system 700 may include several processors, of which only two, processors 702 and 704 are shown for clarity. The processors 702 and 704 may each include a local memory controller hub (MCH) 706 and 708 to enable communication with memories 710 and 712. The memories 710 and/or 712 may store various data such as those discussed with reference to the memory 612 of FIG. 6. As shown in FIG. 7, the processors 702 and 704 may also include the cache(s) discussed with reference to FIG. 6.

In an embodiment, the processors 702 and 704 may be one of the processors 602 discussed with reference to FIG. 6. The processors 702 and 704 may exchange data via a point-to-point (PtP) interface 714 using PtP interface circuits 716 and 718, respectively. Also, the processors 702 and 704 may each exchange data with a chipset 720 via individual PtP interfaces 722 and 724 using point-to-point interface circuits 726, 728, 730, and 732. The chipset 720 may further exchange data with a high-performance graphics circuit 734 via a high-performance graphics interface 736, e.g., using a PtP interface circuit 737.

At least one embodiment of the invention may be provided within the processors 702 and 704 or chipset 720. For example, the DC 120 may be provided within the processors 702 and 704 (or within each core of the processors 702 and/or 704). Other embodiments of the invention, however, may exist in other circuits, logic units, or devices within the system 700 of FIG. 7. Furthermore, other embodiments of the invention may be distributed throughout several circuits, logic units, or devices illustrated in FIG. 7.

The chipset 720 may communicate with a bus 740 using a PtP interface circuit 741. The bus 740 may have one or more devices that communicate with it, such as a bus bridge 742 and I/O devices 743. Via a bus 744, the bus bridge 742 may communicate with other devices such as a keyboard/mouse 745, communication devices 746 (such as modems, network interface devices, or other communication devices that may communicate with the computer network 603), audio I/O device, and/or a data storage device 748. The data storage device 748 may store code 749 that may be executed by the processors 702 and/or 704.

In various embodiments of the invention, the operations discussed herein, e.g., with reference to FIGS. 1-7, may be implemented as hardware (e.g., circuitry), software, firmware, microcode, or combinations thereof, which may be provided as a computer program product, e.g., including a (e.g., non-transitory) machine-readable or (e.g., non-transitory) computer-readable medium having stored thereon instructions (or software procedures) used to program a computer to perform a process discussed herein. Also, the term "logic" may include, by way of example, software, hardware, or combinations of software and hardware. The machine-readable medium may include a storage device such as those discussed with respect to FIGS. 1-7. Additionally, such computer-readable media may be downloaded as a computer program product, wherein the program may be transferred from a remote computer (e.g., a server) to a requesting computer (e.g., a client) by way of data signals embodied in a carrier wave or other propagation medium via a communication link (e.g., a bus, a modem, or a network connection). Accordingly, herein, a carrier wave shall be regarded as comprising a machine-readable medium.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A processor comprising:
   a debug controller to detect an event corresponding to a failure in a computing system; and
   a storage device, coupled to the debug controller, to store data corresponding to other debug controllers in the computing system,
   wherein the debug controller is to transmit data corresponding to the event to one of the other debug controllers based on the stored data, wherein the stored data is to comprise history information of transaction flow across multiple sockets in the computing system.

2. The processor of claim 1, wherein the debug controller is to comprise a plurality of buffers, wherein each buffer is to store a time stamp, an event type, a physical address, and a GUTID (Global Universal Transaction ID per address).

3. The processor of claim 2, wherein the GUTID corresponds to a unique transaction identifier selected from a group comprising: a Requester Source Node ID (RSNID), a Requester Transaction ID (RTID), and a Destination Node ID (DNID).

4. The processor of claim 1, wherein the stored data corresponds to a programmed set of physical addresses.

5. The processor of claim 1, wherein the debug controller is to comprise at least two content addressable memories that are addressable by a physical address or a GUTID.

6. The processor of claim 1, wherein the failure corresponds to one of: a global and temporal failure, a system or cluster coherency failure, or a data inconsistency failure during post silicon debug.

7. The processor of claim 1, wherein the debug controller is to cause storage of information comprising one or more of: an owner per a physical address, a transaction type per the physical address, or a GUTID per the physical address.

8. The processor of claim 1, wherein the computing system is to comprise a plurality of processors.

9. The processor of claim 1, wherein the computing system is to comprise a plurality of sockets.

10. A method comprising:
    detecting an event corresponding to a failure in a computing system;
    storing data corresponding to other debug controllers in the computing system in a storage device accessible by a debug controller, and
    the debug controller transmitting an indicia corresponding to the event to one of the other debug controllers based on the stored data, wherein the stored data comprises history information of transaction flow across multiple sockets in the computing system.

11. The method of claim 10, further comprising storing a time stamp, an event type, a physical address, and a GUTID (Global Universal Transaction ID per address) into one or more buffers.

12. The method of claim 10, wherein the stored data corresponds to a programmed set of physical addresses.

13. The method of claim 10, wherein the failure corresponds to one of: a global and temporal failure, a system or cluster coherency failure, or a data inconsistency failure during post silicon debug.

14. The method of claim 10, further comprising storing an owner per a physical address, a transaction type per the physical address, or a GUTID per the physical address in a memory.

15. A computing system comprising:
    a first processor to comprise a first debug controller, wherein the first debug controller is to detect an event corresponding to a failure; and a storage device, coupled to the first debug controller, to store data corresponding to other debug controllers in the computing system, wherein the first debug controller is to transmit data corresponding to the event to a second debug controller of a second processor based on the stored data, wherein the stored data is to comprise history information of transaction flow across multiple sockets in the computing system.

16. The system of claim 15, wherein the first or second debug controllers are to comprise a plurality of buffers, wherein each buffer is to store a time stamp, an event type, a physical address, and a GUTID (Global Universal Transaction ID per address).

17. The system of claim 16, wherein the GUTID corresponds to a unique transaction identifier selected from a group comprising: a Requester Source Node ID (RSNID), a Requester Transaction ID (RTID), and a Destination Node ID (DNID).

18. The system of claim 15, wherein the stored data corresponds to a programmed set of physical addresses.

19. The system of claim 15, further comprising an audio device coupled to the first processor.

20. The system of claim 15, wherein at least one of the first or second processors is to comprise one or more processor cores.

* * * * *